United States Patent [19]
Johnson et al.

[11] Patent Number: 5,185,709
[45] Date of Patent: Feb. 9, 1993

[54] APPARATUS AND METHOD FOR MEASURING PRESSURE CHANGES WITHIN PRESSURE VESSELS

[75] Inventors: Kenneth A. Johnson, Walworth; Charles E. Ellis, Jr., Phelps, both of N.Y.

[73] Assignee: MDT Corporation, Torrance, Calif.

[21] Appl. No.: 649,480

[22] Filed: Feb. 1, 1991

[51] Int. Cl.⁵ .............................................. G06F 15/20
[52] U.S. Cl. ...................................... 364/558; 73/717; 364/571.05; 377/19
[58] Field of Search ............. 73/717; 364/558, 571.05; 377/19

[56] References Cited

U.S. PATENT DOCUMENTS

| | | | |
|---|---|---|---|
| 3,762,223 | 10/1973 | Feuer et al. | 73/702 |
| 4,178,804 | 12/1979 | Potter | 73/702 |
| 4,239,731 | 12/1980 | Gillis et al. | 422/112 |
| 4,294,804 | 10/1981 | Baran | 422/112 |
| 4,301,685 | 11/1981 | Guillemot | 73/723 |
| 4,393,713 | 7/1983 | Guillemot | 73/701 |
| 4,598,381 | 7/1986 | Cucci | 73/708 X |
| 4,957,007 | 9/1990 | Gray | 73/861.65 |

*Primary Examiner*—Edward R. Cosimano
*Attorney, Agent, or Firm*—Trask, Britt & Rossa

[57] ABSTRACT

Apparatus and methods for detecting pressure changes within the chamber of a pressure vessel are disclosed. The apparatus includes a pressure transducer which is gauge-referenced to atmospheric pressure and has bi-directional capability of determining pressure changes above and below atmospheric pressure. The transducer is structured to provide frequency output and is therefore connected directly to a microprocessor. The microprocessor includes structure programmed to compensate for variations in existing ambient atmospheric pressure.

14 Claims, 5 Drawing Sheets

APPARATUS AND METHOD FOR MEASURING PRESSURE CHANGES WITHIN PRESSURE VESSELS

BACKGROUND OF THE INVENTION

1. Field

This invention relates generally to pressure vessels, such as sterilizers. Specifically, this invention is directed to apparatus and methods for measuring the pressure within the chamber of a pressure vessel which compensate for pressure variations due to extant atmospheric pressure.

2. State of the Art

Pressure vessels, such as sterilizers, are used to treat various items with sterilants to disinfect them. Items which are typically subjected to sterilization in pressure vessels include dishware, surgical drapings, and surgical instruments Pressure vessels used for these purposes are well-known. Sterilizers generally comprise an outer housing which contains a chamber into which items for sterilization are placed, and structure for introducing sterilants into the chamber.

It is important for proper sterilization of items within the chamber to provide a sufficient amount of pressure within the chamber over a sustained period of time. Air is typically removed from the chamber of the sterilizer before the sterilant is introduced. If the air is not completely removed, it can affect the degree to which the sterilant penetrates the items placed within the chamber. Further, in gas sterilization, for example, the pressure in the chamber is used to determine how much sterilant has been introduced, and hence the concentration of the sterilant. It is important, therefore, to determine accurately the amount of pressure within the chamber at any given time, and to assure that pressure within the chamber has reached an appropriate level for thorough and effective sterilization.

Many sterilizers include structure for determining the amount of pressure within the chamber. Such structure typically includes a pressure transducer for determining pressure changes and levels. The transducer is commonly placed in direct communication with the sterilization chamber. Most pressure transducers used in connection with pressure vessels are vacuum referenced; that is, they are referenced at absolute pressure (zero pounds per square inch). These transducers produce a low level output signal proportional to the amount of pressure existing within the chamber. Such pressure measuring systems provide measurement of pressure within the chamber in terms of millivolts which are then amplified to volts. Because computers or microprocessors are typically used with such systems, the analog measurement must then be converted into a digital measurement by means of analog-to-digital converter apparatus. Pressure transducers typically used in sterilizers, in addition to being referenced to absolute zero, are uni-directional and provide measurement of increasing pressures only.

Accurate pressure measurements are seldom achieved in systems currently in use for two main reasons: (1) inaccuracies in measurement due to the physical and structural properties of the equipment used; and (2) inaccuracies due to the reference points used in evaluating the pressure at any given time. Some inaccuracies occur because of losses resulting from the low level signal produced by the transducer. Inaccuracies are also caused by noise in the cable connecting the transducer to the other structures of the component system, such as the amplifier and the analog-to-digital converter. When the millivolt signal is amplified, errors occur as a result of the inherent inaccuracies of the integrated circuitry in the amplifier, including tolerance anomalies and temperature drifting. Additional errors occur because of tolerance and temperature drifting in the components of the analog-to-digital converter. Resolution errors are also inherent in analog-to-digital converters.

Pressure measurements made by existing methods are also inaccurate due to the fact that most transducers are referenced to a zero pounds per square inch (0 psi) reference point. When the chamber is pressurized, it is impossible to determine accurately with current methods what part of the indicated increase in pressure is due to actual pressurization and what part is due to differences in atmospheric pressure at the location where measurement is taking place. Atmospheric pressure may vary from between about 14.7 psi at sea level to about 11.0 psi at higher elevations. The determination of accurate pressure within the chamber is significantly reduced with current systems since they lack any means of compensating for variations in ambient atmospheric pressure.

Thus, there exists a need for a pressure measurement system and method which reduces the errors experienced with current pressure measurement equipment and which further reduces error by compensation for existing atmospheric pressure variations.

SUMMARY OF THE INVENTION

According to the present invention, a method for determining the pressure within the chamber of a pressure vessel provides increased accuracy of measurement by means of improved structure and configuration, and by compensation for variation in existing atmospheric pressure. While the invention is applicable to pressure measurement within any type of pressure vessel, the disclosure is specifically directed to use with sterilizers by way of example.

The structure of the present invention includes a transducer which is gauge-referenced and bi-directional. That is, the transducer is referenced to ambient atmospheric pressure rather than to absolute or zero pressure, and is capable of measuring pressure changes in both a positive and negative direction relative to atmospheric pressure. The transducer of the invention has frequency-based output, and is therefore capable of being placed in immediate communication with a computer. Many of the errors which result from conventionally configured pressure measurement systems are thereby eliminated. That is, errors are reduced as a result of eliminating the need to amplify low level signals. Further, the need to convert from analog to digital format is eliminated, thereby eliminating errors inherent in converter resolutions.

The present invention provides for initial determination of the signature frequency of the pressure transducer installed in the sterilizer. The signature frequency is stored in the nonvolatile memory of the computer and is maintained for use in the event of a power failure. Means for storing a new signature frequency of a new transducer, should the transducer need to be replaced, is also provided. The present invention also provides compensation for variations in existing ambient barometric pressure at initialization of the pressurization cycle. The referencing methods of the present invention reduce or eliminate errors in pressure measurements now experienced with conventional systems.

BRIEF DESCRIPTION OF THE DRAWINGS

In the drawings, which illustrate what is currently considered to be the best mode for carrying out the invention.

DESCRIPTION OF THE ILLUSTRATED EMBODIMENT

Figure 1:
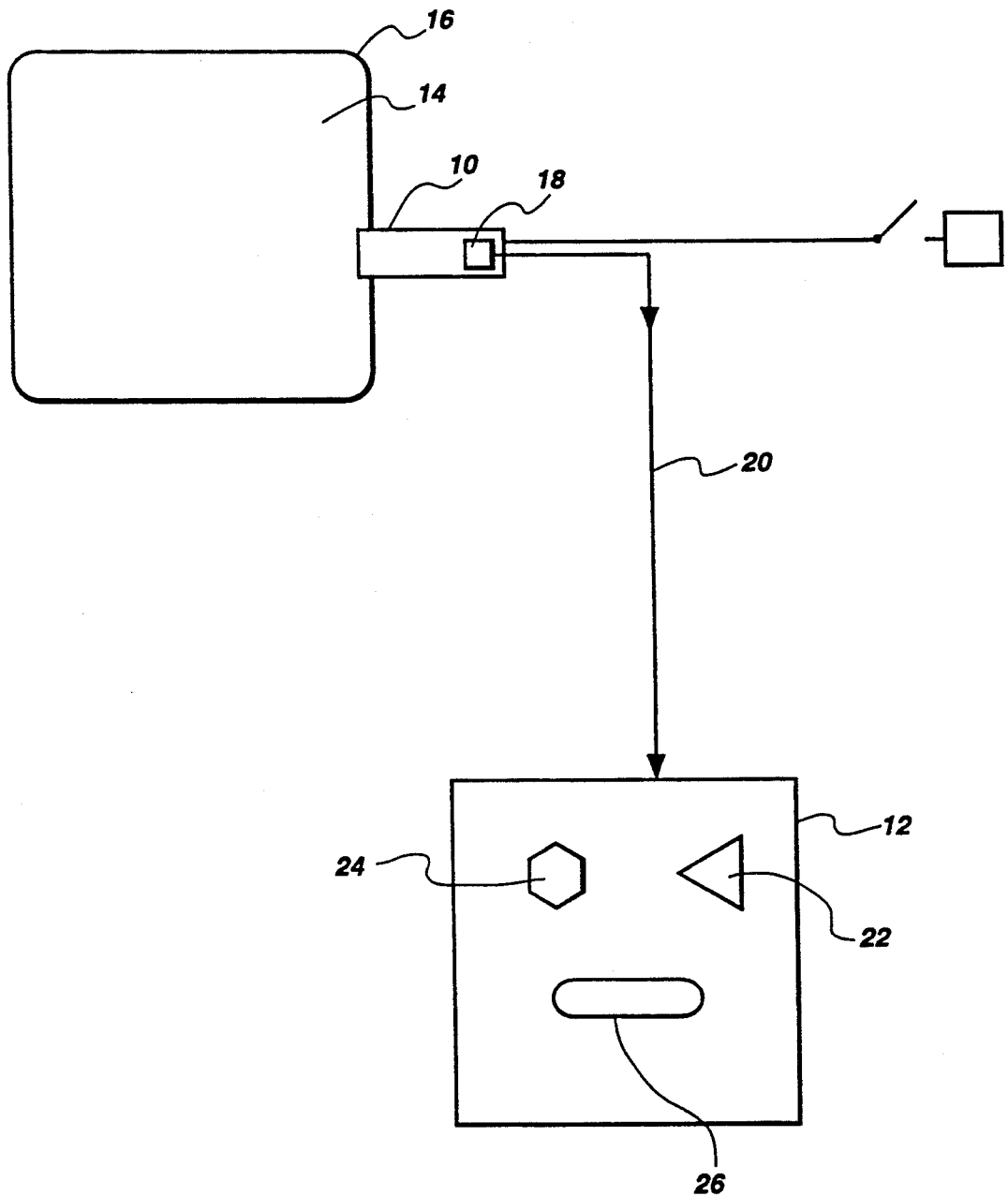
FIG. 1 is a schematic representation of the structure of the invention.

The present invention generally includes a transducer 10, as illustrated by FIG. 1, and a microprocessor 12 in electrical communication with the transducer 10. The transducer 10 is structured to be in direct communication with the chamber 14 of a sterilizer 16. The transducer 10 is operable by any conventional means such as placing an existing power supply 17a in electrical communication 17b with the transducer 10. A switch 17c provides power to the transducer 10. The transducer 10 differs from pressure transducers commonly used in sterilizer units which are structured with an internal reference chamber having an internal pressure value of zero pounds per square inch (psi). Such transducers are known generally as absolute pressure transducers. Any change in pressure detected by the transducer is measured relative to the pressure existing within the reference chamber of the transducer. Therefore, pressure changes are determined relative to zero psi.

The transducer 10 of the present invention, lacking the internal reference chamber of other transducers, communicates directly with the environment within the sterilizer chamber. This type of transducer may generally be referred to as a gauge-referenced transducer. The gauge-referenced transducer 10 is thus referenced at atmospheric pressure, which at sea level would be approximately 14.7 psi. At higher elevations, the referenced atmospheric pressure would be less than 14.7 psi.

The transducer 10 is connected directly to a microprocessor 12. In conventional pressure measurement systems, the transducer produces a low level voltage signal. The signal is produced in millivolts and must be amplified for further use An analog signal in volts is produced by to calculate pressure differentials, the analog signal must be converted to digital format for further processing. Many errors are introduced into the pressure measurement procedure of conventional devices as a result of the components and their configuration. For example, noise resulting in the cable between the transducer and amplifier, and in the cable between the amplifier and the analog-to-digital converter, gives rise to significant anomalies in the signal which are typically manifested by an increase in the signal. Additionally, there are losses which are characteristic to the conversion of analog signals into digital signals.

The transducer 10 of the present invention includes structure in the form of integrated circuitry 18 which converts the voltage signal produced by the transducer 10 to a square wave frequency output 20 so that the transducer 10 can be connected directly to the microprocessor 12 The integrated circuitry 18 in the transducer 10 allows direct communication between the transducer 10 and the microprocessor 12 thereby eliminating most of the signal anomalies due to noise and signal shift.

A zeroing algorithm, designated schematically at 22 by FIG. 1, is part of the programmable structure associated with the microprocessor 12. The zeroing algorithm processes incoming frequency data from the transducer and assigns a zero psi value at a time prior to initialization of the sterilization process when the door is open and the pressure is known. A calculation program, designated schematically at 24 by FIG. 1, is also a part of the programmable structure, and determines the pressure differential existing in the chamber of the sterilizer. Nonvolatile memory 26, also known as EEPROM (electronically erasable programmable read-only memory), is also a part of the microprocessor structure and provides storage of the frequency data provided from the transducer 10.

Each transducer 10 is calibrated by the manufacturer to a specific value and accuracy. transducers produce a very small but cognizable frequency output which is unique to each transducer. The unique signature frequency of each transducer may add as much as one and one half percent error in determining accurate pressure at any given time. To reduce that error, the present invention includes structure within the microprocessor 12 for determining and storing the signature frequency of the transducer. When the sterilizer is turned on for the first time, a reading of the transducer frequency output is made while the door is open. The frequency output of the transducer is stored in the nonvolatile memory 26 of the microprocessor 12. Should a power failure occur, the frequency output may be recalled once the power is restored. The frequency output of the transducer 10 is evaluated by the programmable structure 24 of the microprocessor 12 and is assigned a zero psi value by the zeroing algorithm 22. This vale may also be termed "zero pounds per square inch guage."

Figure 2A:
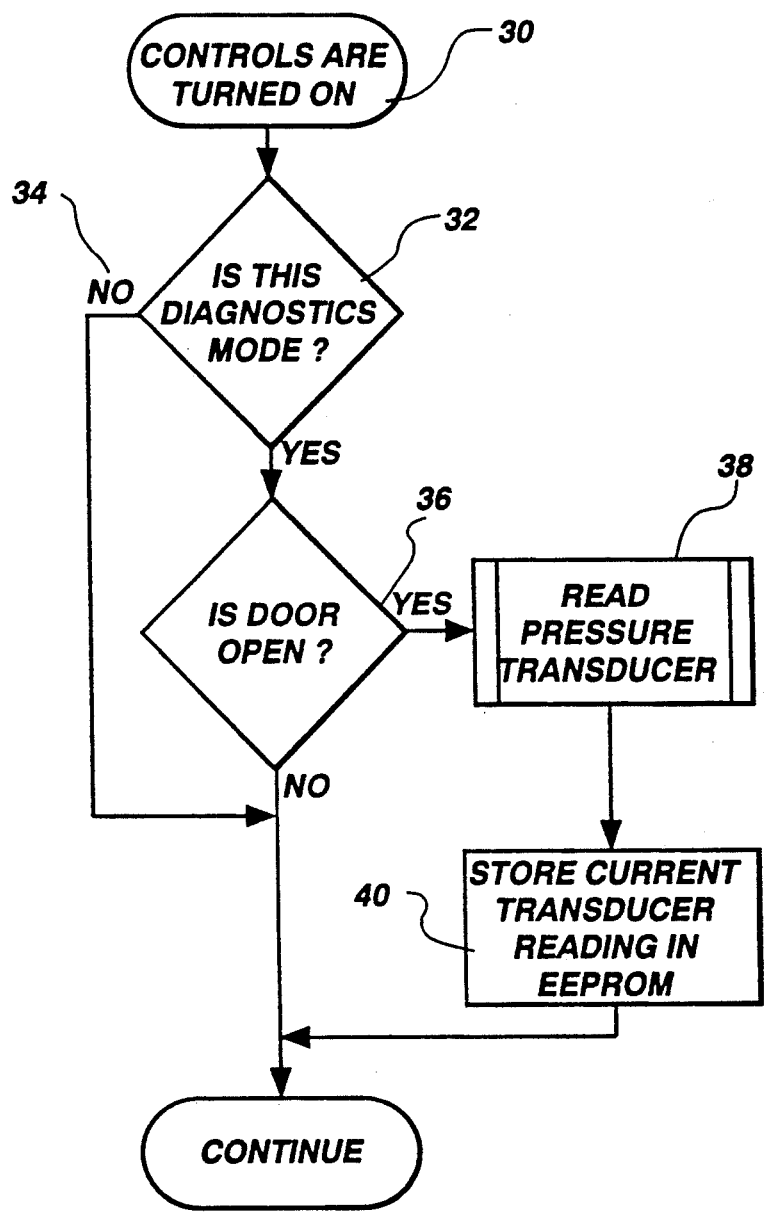
FIGS. 2a-2c are diagrammatical representations of a method for using t he structure illustrated by FIG. 1.

As illustrated by FIG. 2a, when the sterilizer is turned on 30, the microprocessor 12 will ask if a diagnostics mode is required 32. If the signature frequency reading has already been established, as described previously, the sterilizer initialization can continue 34. If a diagnostics mode 32 is required, meaning that the signature frequency must be re-established due, for example, to a change of transducer, the microprocessor 12 will then ask if the door is open 36. With the door open, a reading of the existing pressure is taken 38 and stored in the nonvolatile memory 40 of the microprocessor 12 and sterilizer initialization continues. If the door is closed, no reading will be taken.

Figure 2B:
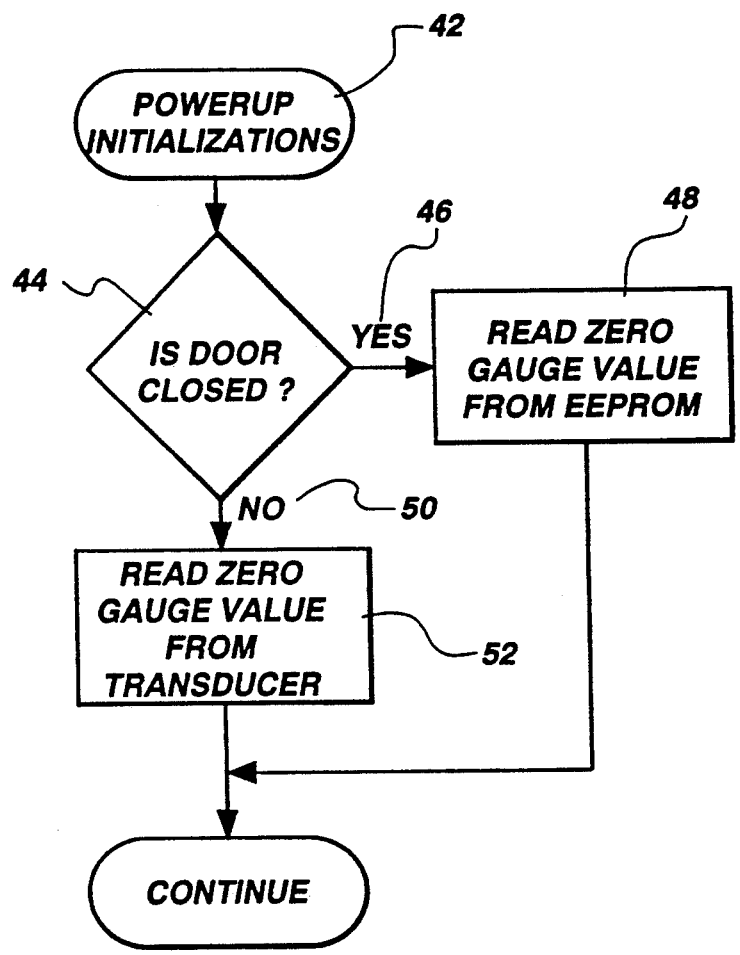

As illustrated by FIG. 2b, after a power failure, when initialization 42 of the sterilization process begins, the microprocessor 12 will ask if the door is closed 44. If the door is closed 46, the microprocessor 12 will recall from its nonvolatile memory the gauge reading value 48 and sterilizer initialization then continues. If the door is not closed 50, the microprocessor will read the frequency output from the transducer 52 and initialization of the sterilizer continues.

Figure 2C:
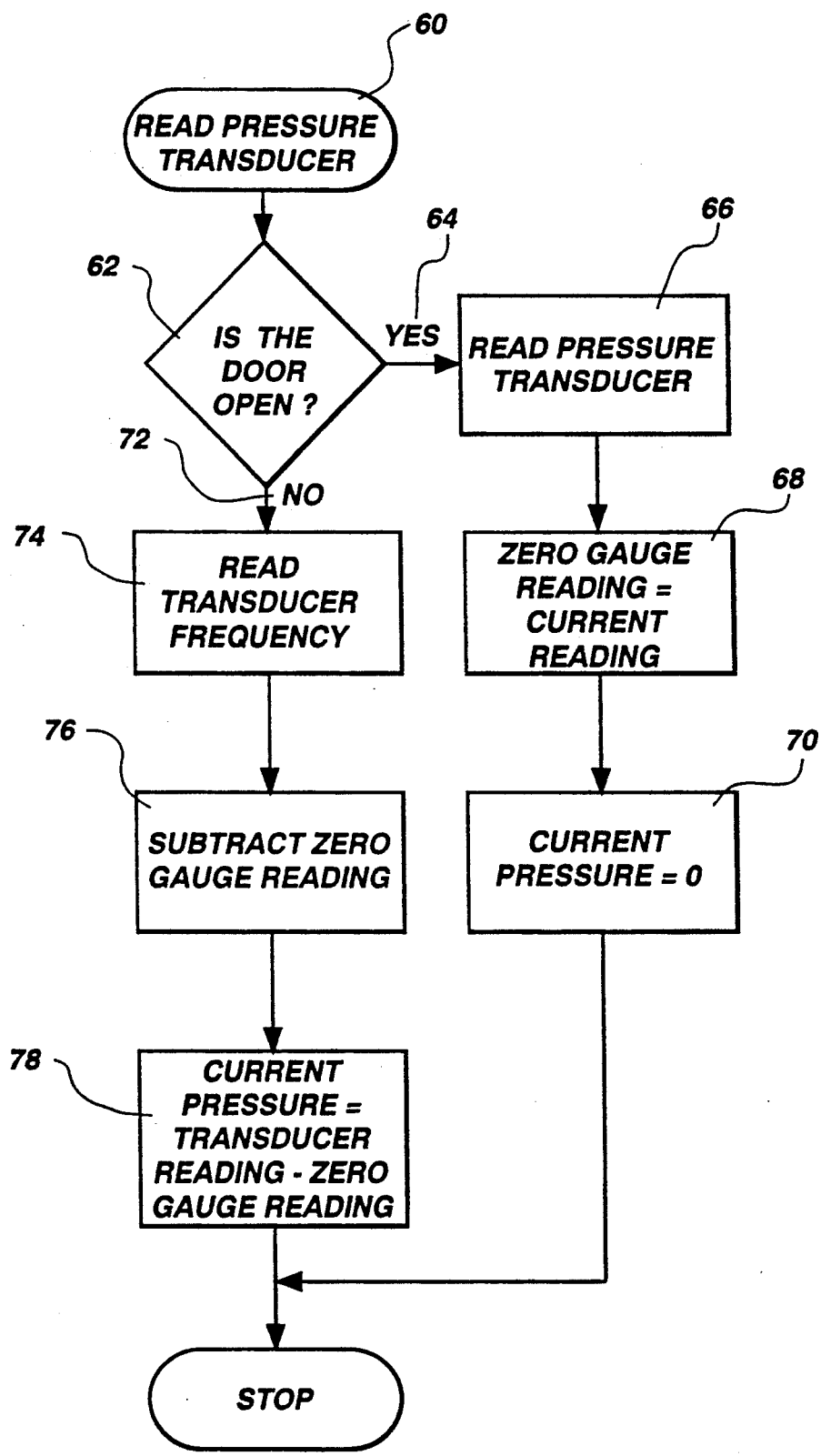

A referencing pressure is taken at the beginning of each sterilization cycle, and as a result, variations in existing ambient atmospheric pressure are compensated for. As illustrated by FIG. 2c, when a reading of the transducer 10 is taken 60, the microprocessor 12 will ask if the door to the sterilizer is open 62. If the door is open 64, the frequency reading of the transducer 66 is the ambient atmospheric pressure, which is assigned a zero psi value 68 by the microprocessor, as previously described. The zero psi value then is equal to the current pressure 70. Determination of the reference pressure is then complete.

If the door to the sterilizer is closed 72, the pressure existing in the chamber 14 of the sterilizer may be different than atmospheric pressure. Differences between the pressure within the chamber and atmospheric pressure may be the result of many factors, including an elevated temperature within the chamber due to the fact that a sterilization cycle has just been completed. Therefore, if the door is closed, a frequency reading is taken 74. That value is subtracted from the assigned zero psi value established by the microprocessor 76, and the resulting current pressure 78 is the difference between the present reading and the predetermined zero psi value. Determination of the reference pressure is then complete. By that procedure, the present invention can compensate for variations in current atmospheric pressures experienced within the chamber.

The transducer 10 is of a bi-directional type, meaning that the transducer is capable of measuring pressure variation both above and below atmospheric pressure. Transducers currently in use are only capable of detecting pressure variations above a set value, usually zero psi. If the barometric pressure within the chamber should drop below the predetermined value, the transducer of the present invention is capable of detecting the pressure differential allowing the microprocessor to compensate accordingly.

Figure 3:
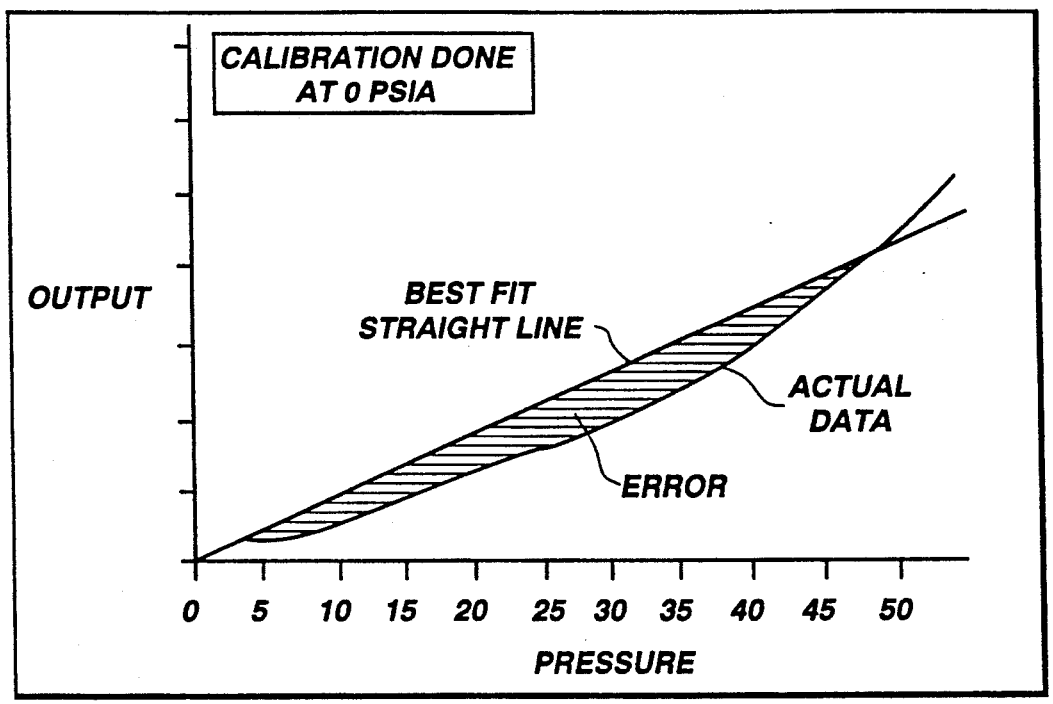
FIG. 3 is a graph illustrating the accuracy of conventional pressure measurement methods.
Figure 4:
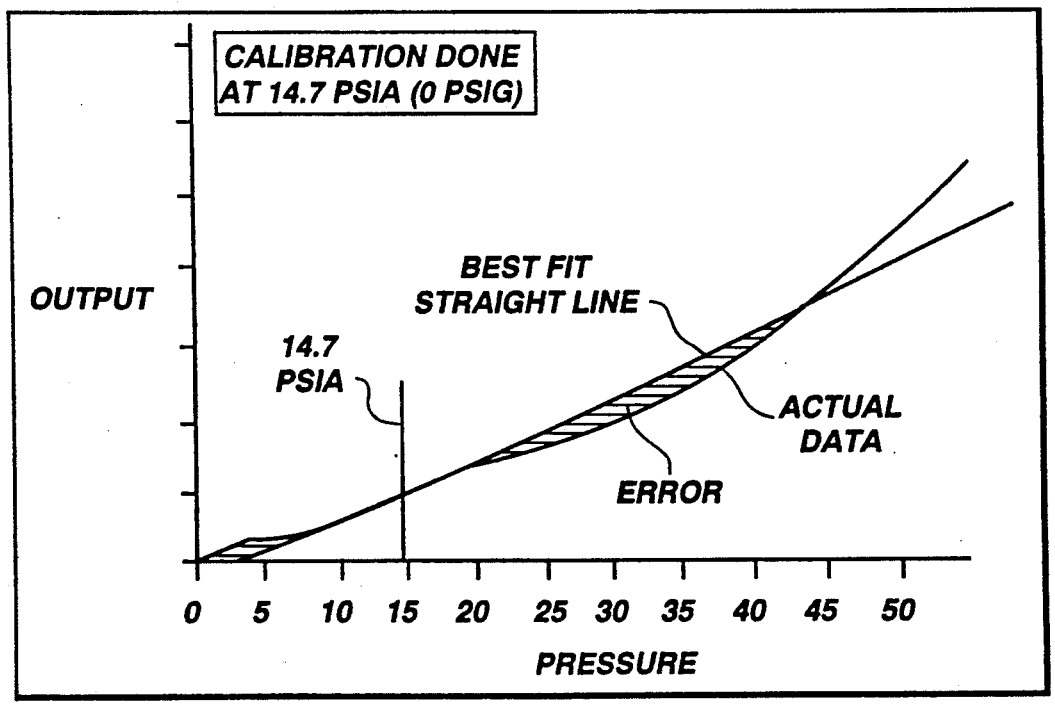
FIG. 4 is a graph illustrating the accuracy of the method of pressure measurement disclosed herein.

The advantage of referencing the pressure measurement system to atmospheric pressure, rather than to absolute zero pressure, is evident by reference to FIGS. 3 and 4. As illustrated by FIG. 3 the margin of error which results when the transducer is referenced to zero pressure per square inch absolute (psia) is significant. However, when the transducer is gauge-referenced, i.e. referenced to atmospheric pressure (psig), the margin of error is considerably reduced or is eliminated, as illustrated by FIG. 4.

The foregoing is illustrative of the embodiment of the present invention and is not intended to limit the scope of the claims which themselves recite those features regarded as important to the invention.

What is claimed:

1. A pressure measurement device for use with a pressure vessel having a chamber, an opening to the chamber, and a door for obstructing the opening comprising:
    a transducer for measuring pressure changes within said chamber of said pressure vessel, said transducer being referenced to atmospheric pressure and having structure for providing frequency output generated in response to pressure conditions existing in said chamber; and
    computer means in communication with said transducer for receiving said frequency output therefrom and having structure programmed to calculate changes in pressure within said chamber.

2. The pressure measurement device according to claim 1 wherein said transducer is configured to detect pressure differentials above and below existing atmospheric pressure.

3. The pressure measurement device according to claim 1 wherein said computer means includes nonvolatile memory for retaining information relative to frequency variations inherent in said transducer.

4. The pressure measurement device according to claim 3 wherein said computer means further includes structure programmed for receiving said frequency output and assigning said frequency output a set value.

5. A method for measuring pressure within the chamber of a pressure vessel having a chamber, an opening to the chamber, and a door for obstructing the opening comprising:
    providing a transducer which is referenced at atmospheric pressure and which contains structure for providing a frequency signal output generated in response to pressure conditions existing within said chamber,
    said transducer being attached to said chamber of said pressure vessel in a manner which enables said transducer to detect changes in pressure within said chamber, and further being attached to
    a microprocessor having structure programmed for receiving an initial frequency signal output and assigning said initial frequency signal output a set value, said microprocessor further having nonvolatile memory for storing said initial frequency signal output and structure programmed for calculating current pressure changes within said chamber;
    performing an initial diagnostic procedure using said transducer to determine said initial frequency signal output for assigning said set value;
    initializing said pressure vessel prior to placing said pressure vessel in an operative mode;
    obtaining a frequency signal output corresponding to the pressure existing within said chamber; and
    calculating pressure changes within said chamber by means of said structure programmed for calculating pressure changes.

6. The method according to claim 5 wherein said step of performing an initial diagnostic procedure for determining said initial frequency signal output for assigning said set value comprises:
    opening said door of said pressure vessel;
    obtaining an initial frequency signal output from said transducer;
    assigning said initial frequency signal output said set value by means of said structure programmed for assigning said value; and
    storing said set value in said nonvolatile memory of said microprocessor.

7. The method according to claim 6 wherein said set value is zero pounds per square inch gauge.

8. The method according to claim 6 wherein said initialization of said pressure transducer system comprises establishing a zero gauge reading.

9. The method according to claim 8 wherein said establishment of a zero gauge reading is performed by recalling said set value from said nonvolatile memory while said door to said chamber is closed.

10. The method according to claim 8 wherein said establishment of a zero gauge reading is performed by obtaining a frequency signal output from said transducer while said door to said chamber is open, and assigning said frequency signal output a zero pounds per square inch value by means of said structure for assigning said set value.

11. The method according to claim 8 wherein said step of obtaining a frequency signal output corresponding to the pressure existing within said chamber is performed by reading the frequency signal output from said transducer while said door of said chamber is open, said frequency signal output being equal to the existing ambient atmospheric pressure.

12. The method according to claim 8 wherein said step of obtaining a frequency signal output corresponding to the pressure existing within said chamber is performed by reading the frequency signal output from said transducer while said door of said chamber is closed.

13. The method according is claim 12 wherein said step of calculating said pressure changes within said chamber comprises calculating the difference between said set value and said frequency signal output reading from said transducer while said door of said chamber is closed.

14. The method according to claim 13 wherein said set value is zero pounds per square inch gauge-referenced.

* * * * *